Figure 1:
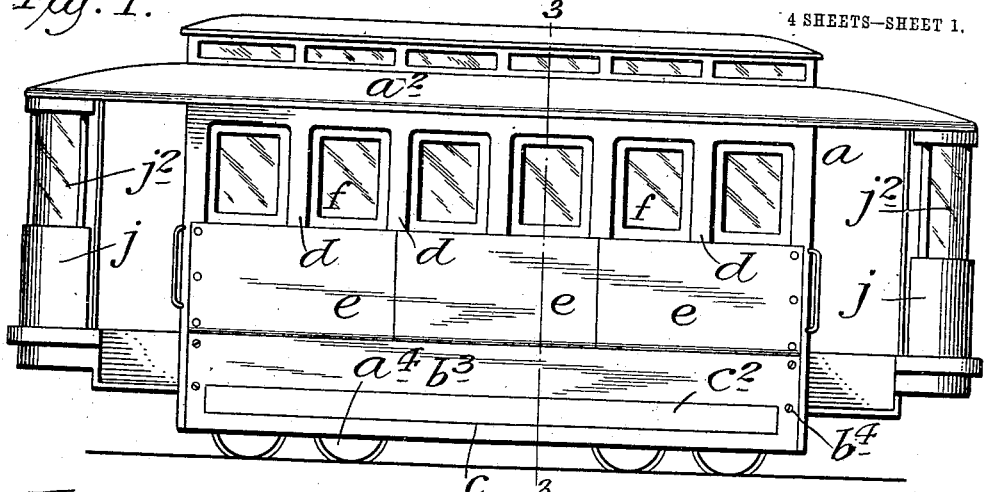

R. GENOVESE.
COMBINATION TRAMWAY CAR.
APPLICATION FILED JUNE 1, 1908.

907,775.

Patented Dec. 29, 1908.

4 SHEETS—SHEET 1.

WITNESSES
M. E. Dordy
C. E. Mulreany

INVENTOR.
Rosario Genovese.
BY Edgar Tate & Co.
ATTORNEYS.

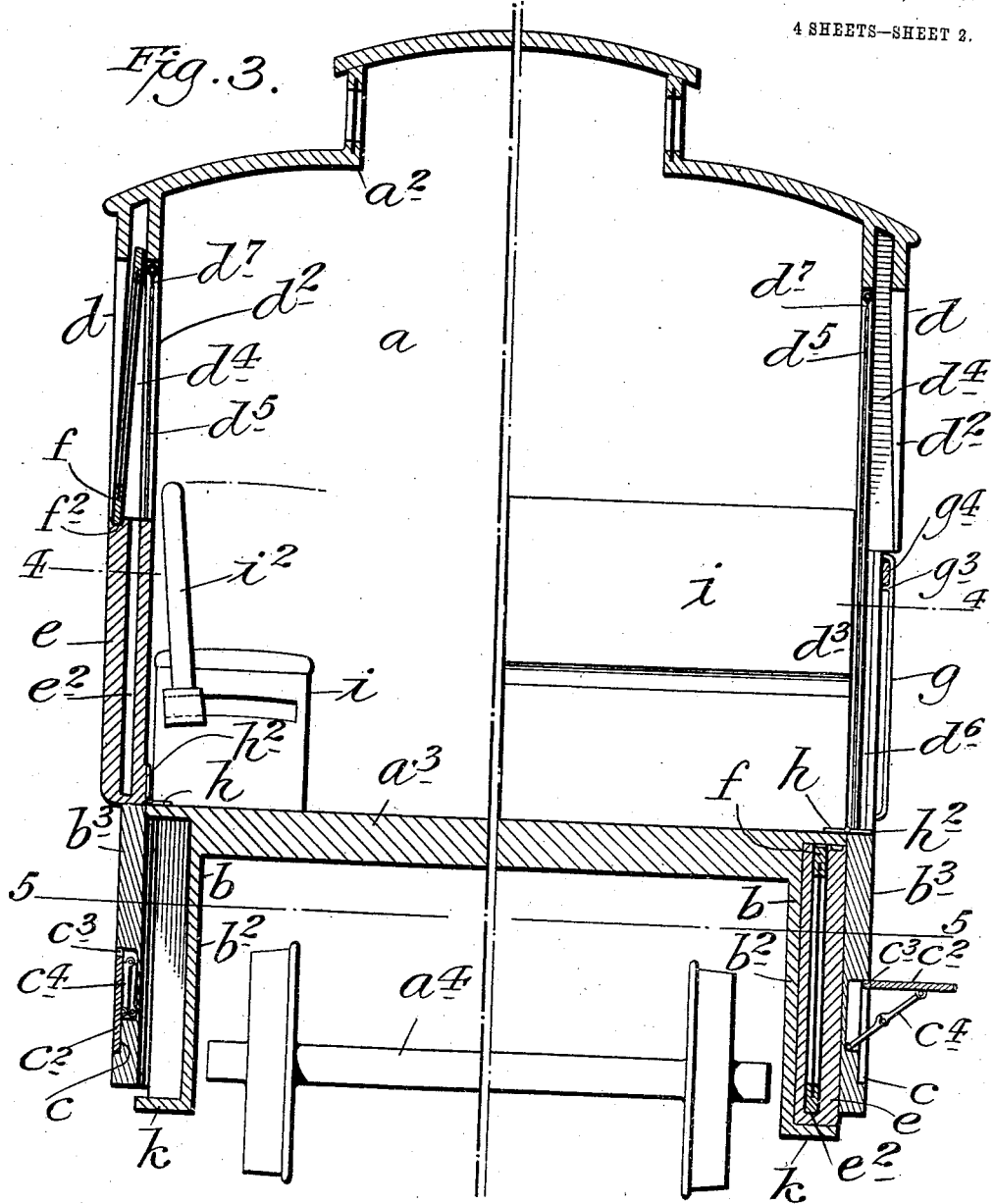

R. GENOVESE.
COMBINATION TRAMWAY CAR.
APPLICATION FILED JUNE 1, 1908.

907,775.

Patented Dec. 29, 1908.

4 SHEETS—SHEET 3.

WITNESSES
M. E. Dordy
C. E. Mulreany

INVENTOR.
Rosario Genovese.
BY Edgar Tate & Co.
ATTORNEYS.

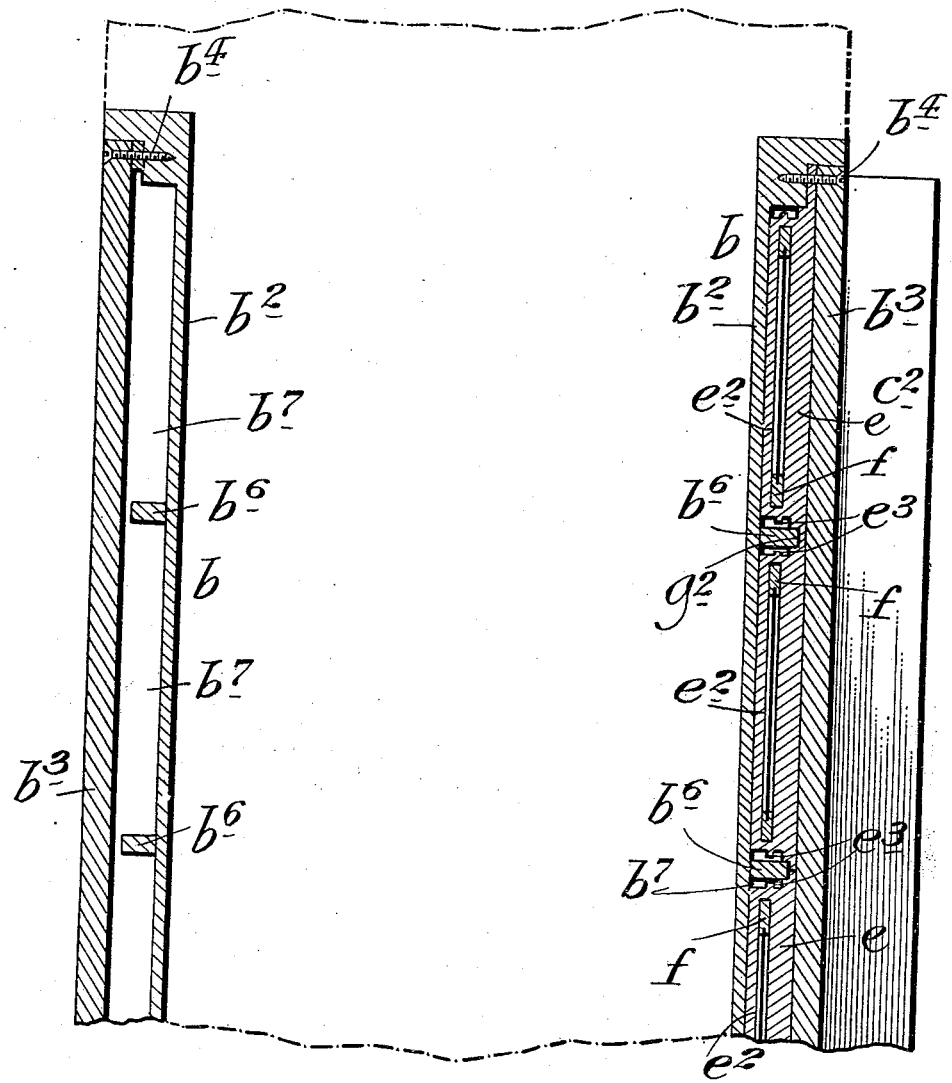

UNITED STATES PATENT OFFICE.

ROSARIO GENOVESE, OF NEW YORK, N. Y.

COMBINATION TRAMWAY-CAR.

No. 907,775.  Specification of Letters Patent.  Patented Dec. 29, 1908.

Application filed June 1, 1908. Serial No. 435,873.

*To all whom it may concern:*

Be it known that I, ROSARIO GENOVESE, a citizen of the United States, and residing at New York, in the county of New York and State of New York, have invented certain new and useful Improvements in Combination Tramway-Cars, of which the following is a specification, such as will enable those skilled in the art to which it appertains to make and use the same.

This invention relates to tramway cars, and the object thereof is to provide a car of this class which may be quickly and easily changed from a closed to an open car whenever it is so desired; a further object being to provide a car of the class specified which is simple in construction and operation and which may be changed from an open to a closed car, or from a closed car to an open car in a short space of time and the seats of which may be used as transverse seats or as longitudinal seats; and with these and other objects in view the invention consists in a tramway car constructed as hereinafter described and claimed.

The invention is fully disclosed in the following specification, of which the accompanying drawings form a part, in which the separate parts of my improvement are designated by suitable reference characters in each of the views, and in which;—

Figure 2:
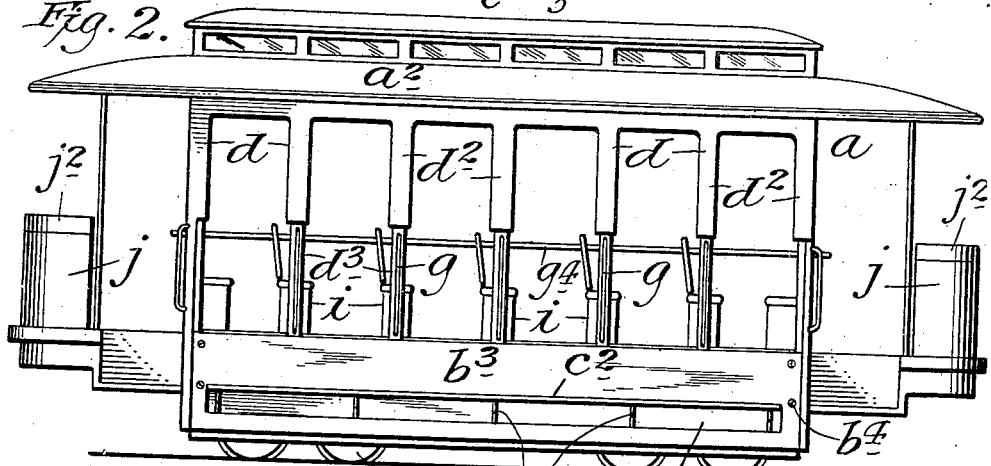
Figure 6:
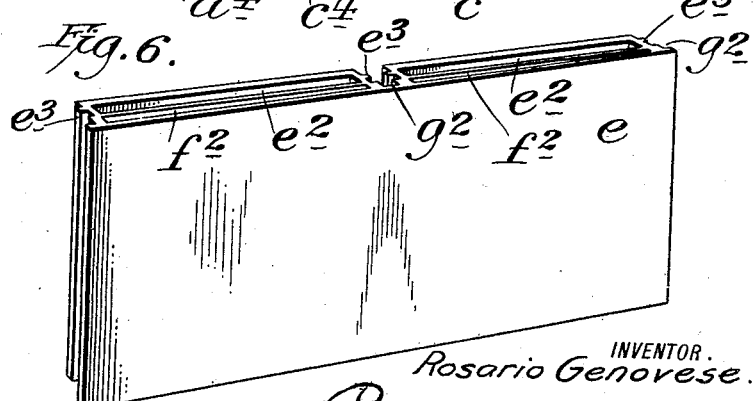
Figure 4:
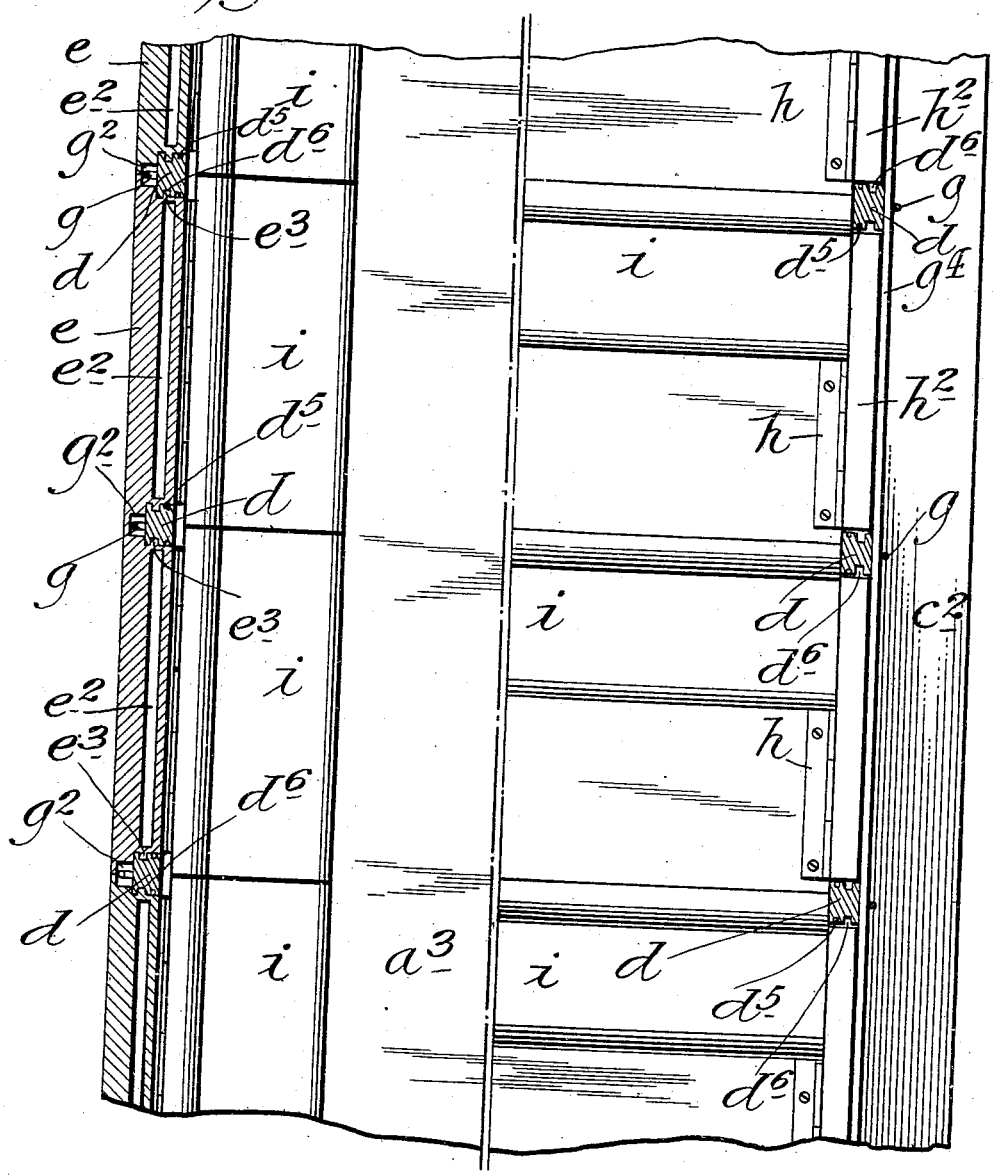

Figure 1 is a side view of my improved car used as a closed car, Fig. 2 a similar view showing the car when used as an open car, Fig. 3 a transverse vertical section on the line 3—3 of Fig. 1, and showing one side of the car closed and the other open, Fig. 4 a horizontal section on the line 4—4 of Fig. 3, Fig. 5 a horizontal section on the line 5—5 of Fig. 3, and Fig. 6 a perspective view of a panel construction which forms a part of the side of the car body.

In the practice of my invention, I provide a car body $a$ of the usual general form and of any desired transverse and longitudinal dimensions, the said car body being provided with a top $a^2$ of the usual form and with a bottom $a^3$ and being mounted on the usual trucks, only the axles and wheels of which are shown at $a^4$.

The body of the car is provided at each side of the bottom $a^3$ with depending and longitudinally ranging housings $b$ comprising inner walls $b^2$ connected with the bottom $a^3$ in any desired manner, and outer removable walls $b^3$ held in place by screws $b^4$ as shown in Figs. 1 and 5, and these housings are divided by vertical ribs $b^6$ formed on or connected with the inner walls $b^2$ thereof into separate compartments or chambers $b^7$.

The outer removable walls $b^3$ of the housings $b$ are provided with longitudinal recesses $c$ midway thereof, in which are hinged running boards $c^2$, said boards being hinged at the top of the recesses $c$ as shown at $c^3$, and hinged to the bottom of the running boards $c^2$ are elbow braces $c^4$ which are also hinged in the backs of the recesses $c$ as clearly shown in Fig. 3, and by means of the elbow braces $c^4$ the running boards $c^2$ may be raised and held in a horizontal position as shown at the right of Fig. 3, or lowered into the recesses $c$ as shown at the left of Fig. 3.

The sides of the car body $a$ consist of a frame-work of stanchions $d$ comprising top portions $d^2$ and bottom portions $d^3$, and vertically movable panel members $e$, three of which are employed on each side, in the form of construction shown. The panel members $e$ are vertically movable and are adapted to be lowered into the compartments $b^7$ in the housings $b$, and said panels are provided with wells $e^2$ adapted to receive window sashes $f$ which close the spaces between the top portions $d^2$ of the stanchions $d$ when the car is used as a closed car, the spaces between the bottom portions of said stanchions being closed by the panels $e$, and when it is desired to convert the car from a closed car to an open car, the sashes $f$ are dropped into the wells $e^2$ of the panels $e$, and said panels are dropped into the compartments $b^7$ in the housings $b$.

In the above described operation the outer walls $b^3$ of the housings $b$ are first removed, after which the panels $e$ with the sashes $f$ therein are moved downwardly to free them from the stanchions $d$, and said panels $e$ are then moved backwardly or inwardly into the compartments $b^7$, and the outer walls $b^3$ of the housings $b$ are secured in place by the screws $b^4$, and these screws also hold the panels $e$ in said housings as shown in Fig. 5.

The top portions $d^2$ of the stanchions $d$ are provided in their opposite sides with grooves $d^4$ in which the sashes $f$ are movable, and these grooves are wider at their lower than at their upper ends, and when the sashes $f$ are raised the bottoms thereof may be moved outwardly so that they will rest in a groove at the top of the panels $e$ as shown at $f^2$ in Fig. 3. The stanchions $d$ are also provided with grooves $d^5$ which extend from the top to the bottom thereof approximately, and in which the curtains $d^7$ or their attachments are movable, and the bottom portions $d^3$ of the stanchions $d$ are also provided with other grooves $d^6$, and the panels $e$ are provided with ribs $e^3$ which are movable in said grooves.

The bottom portions $d^3$ of the stanchions $d$ are also provided at their outer sides with hand rods $g$ which are movable in corresponding grooves or recesses $g^2$ in the panels $e$, and the hand rods $g$ are provided near the tops thereof with inwardly directed projections $g^3$ adapted to support side bars $g^4$ which may be inserted into position longitudinally of the sides of the car whenever desired, and one of these bars is shown in position in Figs. 2, 3 and 4.

Secured longitudinally of the opposite sides of the bottom $a^3$ of the car, in the form of construction shown, and between the stanchions $d$ are wear plates $h$ provided with hinged supplemental plate members $h^2$ which overlap the outer walls $b^3$ of the housings $b$ when the car is used as an open car as shown at the right of Fig. 3, and which are held in an upright position by the panels $e$ when the car is used as a closed car as shown at the left of Fig. 3, but my invention is not limited to these wear plates, and they may or may not be employed, and if employed they may be secured directly to the outer walls $b^3$ of the housings $b$. I also provide seats $i$ which may be placed longitudinally of the car as shown at the left of Figs. 3 and 4, or transversely thereof as shown at the right of Figs. 3 and 4, the transverse arrangement of said seats being also shown in Fig. 2, and these seats may be secured in position in any desired manner, and in practice they are made of such length that two of them when placed transversely reach exactly across the car, and when arranged longitudinally of the car the said seats will extend from one end to the other at each side thereof, and in the form of construction shown in Fig. 4 the breaks between the seats when placed longitudinally of the car are at the center of the stanchions $d$, but when placed transversely of the car as shown in said figure the stanchions $d$ will be at the backs of the seats; but in Fig. 2 the seats are arranged transversely and the stanchions at the middle of the seats; but my invention is not limited to the exact method of placing the seats either transversely or longitudinally, all that is necessary in this construction being that the seats be so constructed and placed that two of them will reach across the car when desired and when placed transversely thereof, and that when placed longitudinally of the car the seats will extend from one end to the other at both sides thereof. The seats $i$ are also provided with reversible backs $i^2$, this construction being indicated only in Fig. 3, but it will be understood that the backs $i^2$ of the seats $i$ are so constructed and applied that when the car reaches the end of a line and starts back without being turned around the positions of the backs of the seats may be reversed in the usual manner.

Instead of holding the panels $e$ in the housings $b$ by means of the screws $b^4$ as shown in Fig. 1, the said housings may be provided with bottoms, or the inner walls $b^2$ thereof may be provided with supports $k$ as shown at the right of Fig. 3, and with this construction the panels $e$ would be secured in said housings by securing the outer walls $b^3$ of said housings in position in any desired manner.

My improved car is also provided with dashboards $j$ having vertically movable sash members $j^2$ which may be raised so as to close the space between the bottom portions of the dashboards and the top of the car when desired.

Although I have shown and described a preferred method of carrying my invention into effect, it will be apparent that changes in and modifications of the construction described may be made, within the scope of the appended claims, without departing from the spirit of my invention or sacrificing its advantages, and I reserve the right to make all such alterations therein as fairly come within the scope of the invention as set out in said claims.

Having fully described my invention, what I claim as new and desire to secure by Letters Patent, is;—

1. A tramway car the body portion of which is provided with sides composed of vertically arranged stanchions, bottom panel members, and top sash members placed between said stanchions, said panel members being provided with wells to receive said sash members, and the body of the car being also provided at the bottom of the sides thereof with housings adapted to receive said panels.

2. A tramway car the body portion of which is provided with sides composed of vertically arranged stanchions, bottom panel members, and top sash members placed between said stanchions, said panel members being provided with wells to receive said sash members, and the body of the car being also provided at the bottom of the sides thereof with housings adapted to receive said panels, the outer walls of said housings being removable and being provided with hinged running boards and longitudinal recesses adapted to receive the same.

3. A tramway car the body portion of which is provided with sides composed of vertically arranged stanchions, bottom panel members, and top sash members placed between said stanchions, said panel members being provided with wells to receive said sash members, and said car body being also provided at the bottom of the sides thereof with housings adapted to receive said panels, said car being also provided with seats adapted to be arranged transversely thereof, or longitudinally of the opposite sides thereof.

4. A tramway car the body portion of which is provided with sides composed of vertically arranged stanchions, bottom panel members, and top sash members placed between said stanchions, said panel members being provided with wells to receive said sash members, and said car body being also provided at the bottom of the sides thereof with housings adapted to receive said panels, the outer walls of said housings being removable and being provided with hinged running boards and longitudinal recesses adapted to receive the same, said car being also provided with seats adapted to be arranged transversely thereof or longitudinally of the opposite sides thereof.

5. A tramway car the body portion of which is provided with sides, consisting of vertically arranged stanchions, bottom panel members detachably connected with and vertically movable on the bottom portions of said stanchions, vertically movable sashes placed between the top portions of said stanchions and adapted to be lowered into wells in said panels, the body of the car being also provided below the bottom thereof with housings adapted to receive said panels.

6. A tramway car the body portion of which is provided with sides, consisting of vertically arranged stanchions, bottom panel members detachably connected with and vertically movable on the bottom portions of said stanchions, vertically movable sashes placed between the top portions of said stanchions and adapted to be lowered into wells in said panels, the body of the car being also provided below the bottom thereof with housings adapted to receive said panels, and said car being also provided with seats adapted to be arranged transversely thereof or longitudinally of the opposite sides thereof.

7. A tramway car the body portion of which is provided with sides consisting of stationary stanchions connected with the top and bottom of the car, bottom panel members mounted on the bottom portions of said stanchions and detachably connected therewith, and sash members mounted between the top portions of said stanchions and vertically movable, said panel members being provided with wells adapted to receive said sash members, and the body portion of the car being provided at the bottom of the sides thereof with housings adapted to receive said panels, and said car being also provided with seats adapted to be arranged transversely thereof or longitudinally of the opposite sides thereof.

8. A tramway car the body portion of which is composed of stationary stanchions, detachable bottom side panels, and vertically movable sash members placed between the top portions of the stanchions, said panels being adapted to receive said sash members and the bottom portion of the car being provided with housings adapted to receive said panels.

In testimony that I claim the foregoing as my invention I have signed my name in presence of the subscribing witnesses this 29th day of May, 1908.

ROSARIO GENOVESE.

Witnesses:
   M. E. DOODY,
   C. E. MULREANY.